No. 812,897. PATENTED FEB. 20, 1906.
J. H. SUTHERLAND.
HAY RAKE ATTACHMENT.
APPLICATION FILED DEC. 12, 1904.
2 SHEETS—SHEET 1.
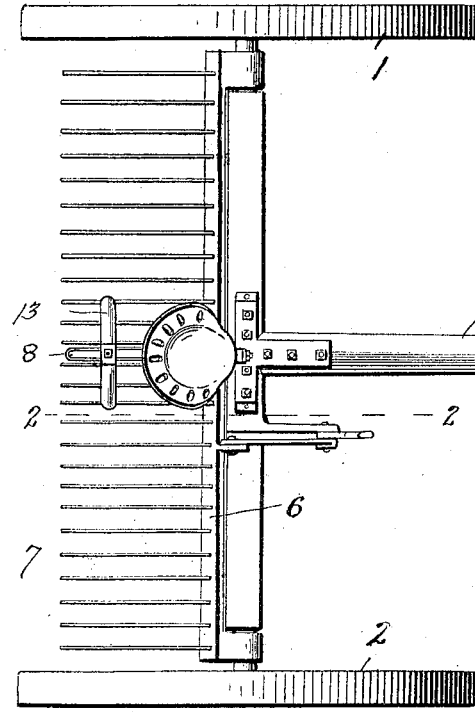
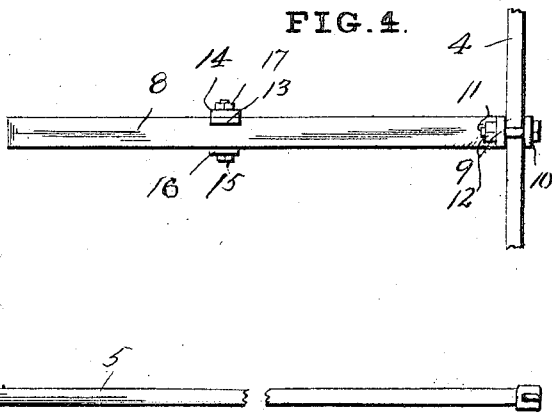
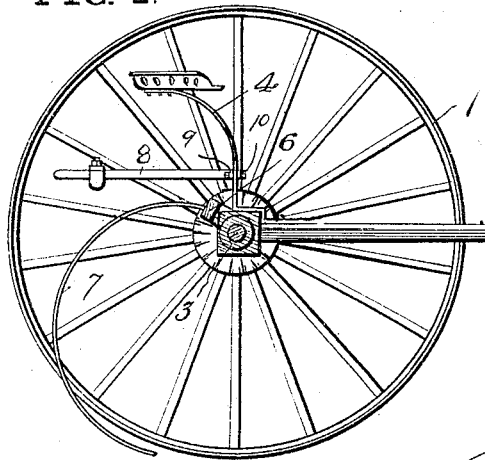
WITNESSES:
INVENTOR
BY
Attorney

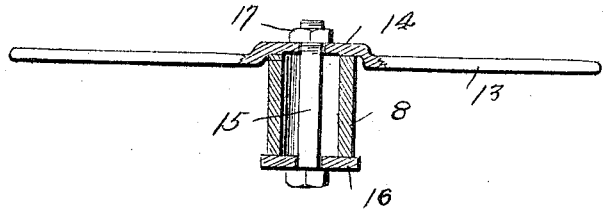
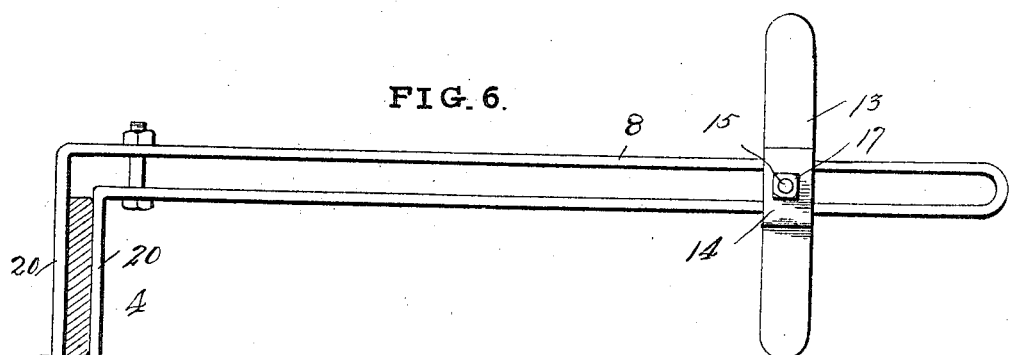
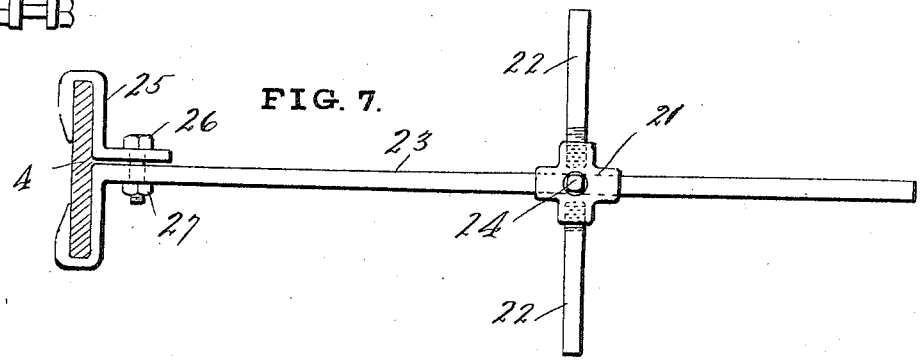
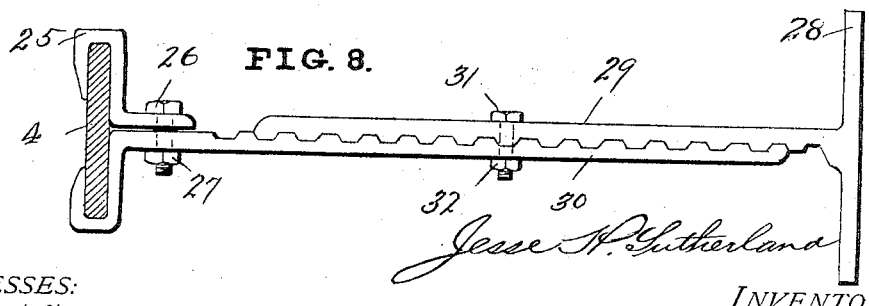

UNITED STATES PATENT OFFICE.

JESSE H. SUTHERLAND, OF DAWKINS, COLORADO.

HAY-RAKE ATTACHMENT.

No. 812,897.     Specification of Letters Patent.     Patented Feb. 20, 1906.

Application filed December 12, 1904. Serial No. 236,630.

*To all whom it may concern:*

Be it known that I, JESSE H. SUTHERLAND, a citizen of the United States, residing at Dawkins, in the State of Colorado, have invented certain new and useful Improvements in Hay-Rake Attachments, of which the following is a specification.

My invention relates to improvements in hay-rakes, and has for its object the provision of a device to be used in conjunction with hay-rakes for the purpose of insuring that the teeth of the rake after having been lifted or raised to dump a load of gathered hay shall be returned rapidly to lowered position in time to catch the hay immediately in front of the winnow on the ground.

The invention consists in a device which may be adjustably applied as to its height to a suitable support on the frame of the rake-machine, and the means for returning the rake-teeth to lowered position is also adjustable for the purpose of forming different-sized winnow.

The invention further consists in certain novel features of constructions and combination and arrangements of parts, as will be described hereinafter, more fully pointed out in the claims, and as illustrated in the accompanying drawings, in which—

Figure 1 is a top plan view of a hay-rake with my improved device applied thereto. Fig. 2 is a section on line 2 2, Fig. 1. Fig. 3 is an enlarged top plan view of the device, showing the seat-bar of the rake-machine in section. Fig. 4 is a side elevation of Fig. 3. Fig. 5 is an enlarged detail section showing the connection of parts of the device. Fig. 6 is a plan view showing a modified fashion of applying the device to the seat-post of the machine. Fig. 7 is a plan view of a modified construction, showing adjustable adaptation of the device; and Fig. 8 is a plan view of a further modification of the principles of my invention.

In the drawings I have illustrated a hay-rake to be drawn by horses. Said rake is of usual construction having the wheels 1 and 2 journaled on shaft 3 and provided with the seat-post 4 and tongue 5. The rake-bar 6, having the rake-teeth 7, is pivoted, as usual, and may be operated in any suitable manner.

The device which constitutes the principal feature of my invention may be attached to any suitable rigid support on the frame of the machine, preferably the seat-post 4. The slotted or bow-shaped bar 8 is formed with turned-out ends 9 9, provided with bolt-holes. This bar may be attached to the seat-post 4 by means of the plate 10 and bolts 11 and nuts 12. To clamp the bar 8 to the seat-post, the ends 9 are placed against the post, and plate 10 is located on the opposite side of the post. Then the bolts 11 are passed through the turned-out ends 9 9 and each end of plate 10 and nuts 12 are applied, as will be understood from a mere inspection of the drawings. The bar is attached to the seat-post in such position that it will project toward the rear of the machine over the rake-teeth and may be adjusted to any desired height within limits on the seat-post.

The cross-bar 13 is fashioned with a raised center portion 14, sufficiently wide at its under side to span the slotted or bow-shaped bar 8. Thus when the cross-bar 13 is held down to position on the bar 8 it overhangs the edges of the bar 8, thus preventing displacement of the bar 13 by the teeth of the rake striking it.

Bar 13 may be located and held to any adjusted position on bar 8 by means of the bolt 15, which is passed through a hole in securing-plate 16 and the slot of the slotted bar 8 and clamped, by means of the nut 17, on the top of the cross-bar 13. The end of the bar 8 may be rounded to prevent catching the teeth of the rake when lifted, the rounded end causing the teeth to glance off from the bar should they strike thereon.

The bar 8 may be adjusted as to its height by means of the bolts 11 and nuts 12, and the cross-bar 13 may be adjusted longitudinally by means of bolt 15 and nut 17 to make different-sized winnows.

In use when a winnow has been gathered and the rake-teeth bodily lifted from the ground the teeth at the center of the rake strike the obstructing cross-bar 13, which has been previously adjusted to the desired position, and after the hay has been deposited the rake-teeth are caused to suddenly drop in time to catch the hay immediately in front of the last winnow.

If the rake is being used where the device is not required, the cross-bar 13 may be held in position out of the way of the rake-teeth by loosening nut 17, so that the bar may be raised and turned to position parallel with the bar 8, when bar 13 will be out of the way of the rake-teeth, allowing them to be raised to their full height.

In Fig. 6 the bar 8 has its ends 20 20 turned to an angle at one side of its center, so that the device may be applied to a suitable support on the machine.

A modified form of adjustable cross-bar is illustrated in Fig. 7, wherein the coupling or casting 21, carrying the tubular cross-arms 22, is adapted to slide and may be adjusted on bar 23 by means of the set-screw 24. The bar 23 is attached to post 4 by means of the turned-out end of bar 23, the clamp-piece 25, and a bolt 26, locked by nut 27.

Adjustment of the cross-bar 28 (illustrated in Fig. 8) may be effected by means of the toothed bars 29 and 30, said bars being clamped to desired extended position by means of bolt 31 and nut 32, and these bars may be attached to their support in manner similar to the construction shown in Fig. 7.

Having thus described my invention, what I claim as new, and desire to secure by Letters Patent, is—

1. The combination with a rake and the seat-post thereof, of a member connected to said post, and adjustable means connected to said member for obstructing the lift of the rake.

2. The combination with a rake and supporting-frame therefor, of a bar connected adjustably to said frame, and adjustable means connected with said bar for limiting the lift of the rake.

3. The combination with a rake and its supporting-frame, of a bar connected to said frame located above the rake, and means thereon for limiting the lift of the rake.

4. The combination with a rake and its supporting-frame, of a bar adjustably connected to said frame located above the rake, and said bar provided with means for limiting the lift of the rake.

5. The combination with a rake having a suitable supporting-frame of a bar adjustably connected to said frame and located above said rake, having adjustable means for limiting the lift of said rake.

6. The combination with a rake and supporting-frame, of a bar clamped to said frame, and a cross-bar secured on the first bar and located in the path of the lift of the rake.

7. In a rake, the combination with the seat-post, of a bar having means for attachment thereto, a cross-bar fastened to said first-mentioned bar and located in the path of the lift of the rake.

8. The combination with a rake, of a seat-post, a slotted bar having means for attachment thereto, and a cross-bar adjustably connected to said slotted bar and located in the path of the lift of the rake.

9. In a rake, the combination with the seat-post thereof, of a slotted bar having means for attachment to said post, a bar arranged at right angles to said slotted bar and located in the path of the lift of the rake, and a bolt and nut for clamping said bars together.

In testimony whereof I affix my signature in presence of two witnesses.

JESSE H. SUTHERLAND.

Witnesses:
H. P. VORIES,
ABBIE E. DAWSON.